United States Patent
Chou et al.

(10) Patent No.: US 8,279,736 B2
(45) Date of Patent: Oct. 2, 2012

(54) MULTILEVEL RECORDING METHOD AND SYSTEM THEREOF

(75) Inventors: Lih-Hsin Chou, Hsichu (TW); Chao-Yu Xiang, Yunnan (CN)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 13/096,055

(22) Filed: Apr. 28, 2011

(65) Prior Publication Data

US 2012/0106305 A1    May 3, 2012

(30) Foreign Application Priority Data

Oct. 29, 2010    (TW) .............................. 99137379 A

(51) Int. Cl.
*G11B 7/00* (2006.01)
(52) U.S. Cl. ................. 369/110.01; 369/100; 369/13.28
(58) Field of Classification Search ............... 369/13.28, 369/13.29, 100, 110.01, 110.02, 13.02, 275.2, 369/284, 288
See application file for complete search history.

(56) References Cited

U.S. PATENT DOCUMENTS

| | | | | |
|---|---|---|---|---|
| 5,498,507 A | * | 3/1996 | Handa et al. | 369/284 |
| 6,775,218 B1 | * | 8/2004 | O'Neill et al. | 369/59.11 |
| 2002/0018438 A1 | * | 2/2002 | Tsukagoshi et al. | 369/275.3 |
| 2002/0067681 A1 | * | 6/2002 | Kikukawa et al. | 369/100 |
| 2002/0186648 A1 | * | 12/2002 | Ohno et al. | 369/275.4 |
| 2003/0107976 A1 | * | 6/2003 | Nakamura et al. | 369/100 |
| 2005/0213487 A1 | * | 9/2005 | Yamamoto et al. | 369/288 |
| 2006/0280043 A1 | * | 12/2006 | Ovshinsky et al. | 369/13.02 |
| 2008/0037406 A1 | * | 2/2008 | Yuzurihara et al. | 369/284 |
| 2009/0286037 A1 | * | 11/2009 | Tsuchino et al. | 428/64.5 |

* cited by examiner

*Primary Examiner* — Thang Tran
(74) *Attorney, Agent, or Firm* — Harness, Dickey & Pierce, PLC

(57) ABSTRACT

The present invention discloses a multilevel recording method and system thereof. The multilevel recording method applied to a recording media comprises the following steps. At First, a plurality of beams are provided to a recording layer of the recording media, and the recording layer has a first structure and a second structure. Then, a first polarized reflected light of the first structure and a second polarized reflected light of the second structure are detected by a detecting unit. Then, a corresponding table is stored by a storing unit. The corresponding table comprises a relationship between the different angle of the polarized reflected light and a level of multilevel recording. Finally, the processing unit looks up the corresponding table to process multilevel recording.

26 Claims, 3 Drawing Sheets providing a plurality of beams to a recording layer of the recording media. The recording layer has a first structure and a second structure. The first structure and the second structure could have a different atomic arrangement structure microscopically, a different appearance of a macroscopic structure, a different concentration structure or a different phase structure. —— S1 detecting a first polarized reflected light of the first structure and a second polarized reflected light of the second structure by a detecting unit so as to calculate a polarized angle difference value between the first polarized reflected light and the second polarized reflected light. —— S2 storing a corresponding table by a storing unit. The corresponding table comprises a corresponding relationship between the polarized angle difference value and a multilevel recording. —— S3 looking up the corresponding table to process multilevel recording by the processing unit. —— S4

FIG. 3

MULTILEVEL RECORDING METHOD AND SYSTEM THEREOF

FIELD

The exemplary embodiment(s) of the present invention relates to a field of a multilevel recording method and a system thereof. More specifically, the exemplary embodiment(s) of the present invention relates to a method and a system thereof that process the multilevel recording by detecting the ellipse parameter of a recording media.

BACKGROUND

The conventional recording media comprises two types: memory and disk. Functionally, the memory could be divided into three kinds of silicon-base memory such as read only memory (ROM), flash memory and read access memory (RAM).

The structure of the memory is quite simple, which is constructed by lots of tiny transistors that could be recharged repeatedly. Each tiny transistor is in a charged or non-charged status. When the transistor is charged or non-charged, the status of the transistor will be represented by "1" or "0" so as to record the data.

Except the aforesaid three kinds of memory, there still are memories comprising new recording layers, such as ferroelectric memory (FRAM), phase change memory (PRAM), magnetoresistive random access memory (MRAM) or resistance memory (RAM) . . . , etc.

FRAM uses the residual polarized properties of the ferroelectric materials to control the field-effect conductivity of the semiconductor to represent the memory properties. When an electric field is applied to the ferroelectric crystal, the central atoms are moved with the direction of the electric field. Due to the motion of the atoms is inside the crystal, a charge spike is generated by passing an energy barrier. An inside-circuit could sense the charge spike and processes the memorization. When the electric field is removed from the crystal, the central atoms will remain at a proper position to keep the memorization status.

PRAM is a non-volatile memory, which is the same with the common flash memory, but the principle of the data reading or writing of these two kinds of memories are different. The operating principle of the PRAM is very similar with an optical disk, which uses a so-called sulfur compounds such as germanium (Ge), antimony (Sb), tellurium (Te) as a core, and changes the material status between crystalline and amorphous by heating under the control of heating parameters and dissipating conditions, so as to generates different resistance to record the signals such as 0 or 1 by changing the crystalline status of the materials.

The inside structure of the MRAM is composed by one transistor and a magnetic tunnel junction storage unit (MTJ). The MTJ has three layers therein, the top layer is a free layer, the middle layer is a tunnel junction, and the bottom layer is a fixing layer. The polarized direction of the magnetic field of the free layer is fixed. When the directions of the magnetic field of the free layer and the fixing layer are parallel, the storing unit is low resistive; and when the directions are opposite, the storing unit is high resistive. By detecting the resistance of the storing unit, the MRAM could determine that the data recorded is 0 or 1.

The operating principle of the RRAM is to apply an external voltage at two ends of the electrodes, and so change the resistance of the metal oxide from high to low. By using these two kinds of resistance configuration, the function of the memory could be completed, which means that at high resistance status is 1 and at low resistance status is 0.

In the disks, except the CD-ROM which the data is pre-cast on the substrate needs no recording layer, the rest disks all need the recording layer to achieve the function of recording data on the disk. The recording layers are substantially categorized two different kinds of one-time recoding layer and rewriting recording layer.

For the write-once recoding layer, the disk is changed by emitting light thereon, and the disk change will cause the change of the light reflection. The data 1 or 0 is generated by determining the strength of the reflected laser. There are two kinds of recording way of write-once recoding layer: hole-burning type and phase change type. For the hole-burning type recoding layer, the part of the recording layer emitted by the laser is melted and a hole is formed at the emitted site, and it causes the interference of the laser and changes the intensity of the reflected laser. On the other hand, for the phase change type recoding layer, the reflectance of the recording layer itself is changed by applying a high intensity laser to the recording layer and so to change the crystalline status of the recording layer.

For the rewritable recording layer, there are two types of way to achieve the goal: magnetic-optical recording and phase change type. The writing process of the former is to focus the laser on the recording layer, and heat the emitted region to near the Curie temperature by the ferromagnetism recording material absorbing the heat. The inside magnetic molecular are thus at an unstable arranged state, and the magnetic structure of the heated part is becoming disordered and the coercive force is becoming zero, thus the magnetic moment is easy to change with an applied external magnetic field. By applying a vertical magnetic field near the heated region, the magnetization direction of the magnetic molecular is aligned upward or downward. When removing the laser and thus decreasing the temperature of the recording layer, the coercive force will back to the original status, so the magnetic moment of this region is remained along the new direction, and the arrangement of the magnetic molecular is fixed, which the upward represents 1 and downward represents 0. The erasing is the same as writing, which heats the disk material to higher than the Curie temperature, and applies a fixed downward magnetic field so as to write the disk with 0.

The method of reading the data is to use the magneto-optical Kerr effect. When reading the data recorded on the disk, a linear polarized laser is incident to the recording layer of the magneto-optical disk. When the reflected light is reflected from the surface, the incident light is effected by the vertical magnetization (M) of the magneto-optical material, and it generates a relative rotation angle ($\theta_k$) called Kerr angle between the reflected light or transmitted light and the original incident polarized light. Assume that the Kerr angle of the upward magnetization direction vertical to the thin film is $+\theta_k$, then the Kerr angle of the downward magnetization direction will be $-\theta_k$. By representing the $+\theta_k$ and the $-\theta_k$ with 0 and 1 respectively, the Kerr angle of the reflected laser could be determined positive or negative, and the serial digital signals pre-recorded on the magneto-optical disk could be read. Thus users could repeat the operations of writing, reading and erasing until the material fails.

For the phase change disk, through rapidly heating and cooling the disk by a laser, the crystalline status of the disk having a 30% reflectance is change to amorphous state and the disk having a 15% reflectance. Different to the read-only disk, the rewritable disk could recover to the original crystalline status by slowly increasing and decreasing the temperature, so as to achieve the goal of re-writing.

However, due to the resolution limitation of the reflected light, only two-level recording (0 and 1) could be processed, and this limits the development of a huge-capacity storage apparatus such as a memory. Therefore, a new recording method is required to raise the data recorded amount of single recording spot of the memory or the storage apparatus.

SUMMARY

To solve the problems in the conventional arts, it is a primary object of the present invention to provide a new multilevel recording method and a system thereof to effectively increase the amount of data recorded on single recording spot.

To achieve the above object, a multilevel recording method according to the present invention is disclosed, which is applicable to a recording media and comprises the following steps of: providing a plurality of beams to a recording layer of the recording media, the recording layer having a first structure and a second structure; detecting a first polarized reflected light of the first structure and a second polarized reflected light of the second structure by a detecting unit; calculating a polarized angle difference value between the first polarized reflected light and the second polarized reflected light by a processing unit; storing a corresponding table by a storing unit, the corresponding table comprising a corresponding relationship between the polarized angle difference value and a multilevel recording; looking up the corresponding table to process multilevel recording by the processing unit.

To achieve another object, a multilevel recording system according to the present invention is disclosed, which is applicable to a recording media having a recording layer with a first structure and a second structure. The multilevel recording system comprises a light source, a detecting unit, a storing unit and a processing unit. The light source provides a plurality of beams to the first structure and the second structure of recording media. The detecting unit detects a first polarized reflected light of the first structure and a second polarized reflected light of the second structure. The storing unit stores a corresponding table having a corresponding relationship between a polarized angle difference value and a multilevel recording. The processing unit calculates the polarized angle difference value between the first polarized reflected light and the second polarized reflected light, and the processing unit further looks up the corresponding table to process multilevel recording according to the polarized angle difference value.

With the above arrangements, the multilevel recording method and the system thereof according to the present invention has one or more of the following advantages:

(1) The multilevel recording method and the system thereof could crystallize the recording layer of the recording media with different extent of partial crystallization by adjusting the intensity of the writing-laser on the recording spot. Due to the polarized angle of the reflected light of the recording media is related to the percentages of the crystalline status of the recording layer, the present invention could process the multilevel recording according to the identification of the crystalline status of the recording layer.

(2) The multilevel recording method and the system thereof could identify the partial crystalline status so as to process the multilevel recording by coordinating with proper recording media, and detecting the polarized angle of the reflected light.

(3) The multilevel recording method and the system thereof could change the first structure or the second structure of the recording layer by applying electric wave, acoustic wave, electric force, magnetic force, stress or heating to the recording layer. The present invention could process the multilevel recording by detecting the polarized angle difference value of the first structure and the second structure.

With these and other objects, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIG. 3 illustrates a flow chart of the multilevel recording method in accordance with the present invention.

DETAILED DESCRIPTION

Exemplary embodiments of the present invention are described herein in the context of an illuminating system and a method thereof.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

Figure 1:
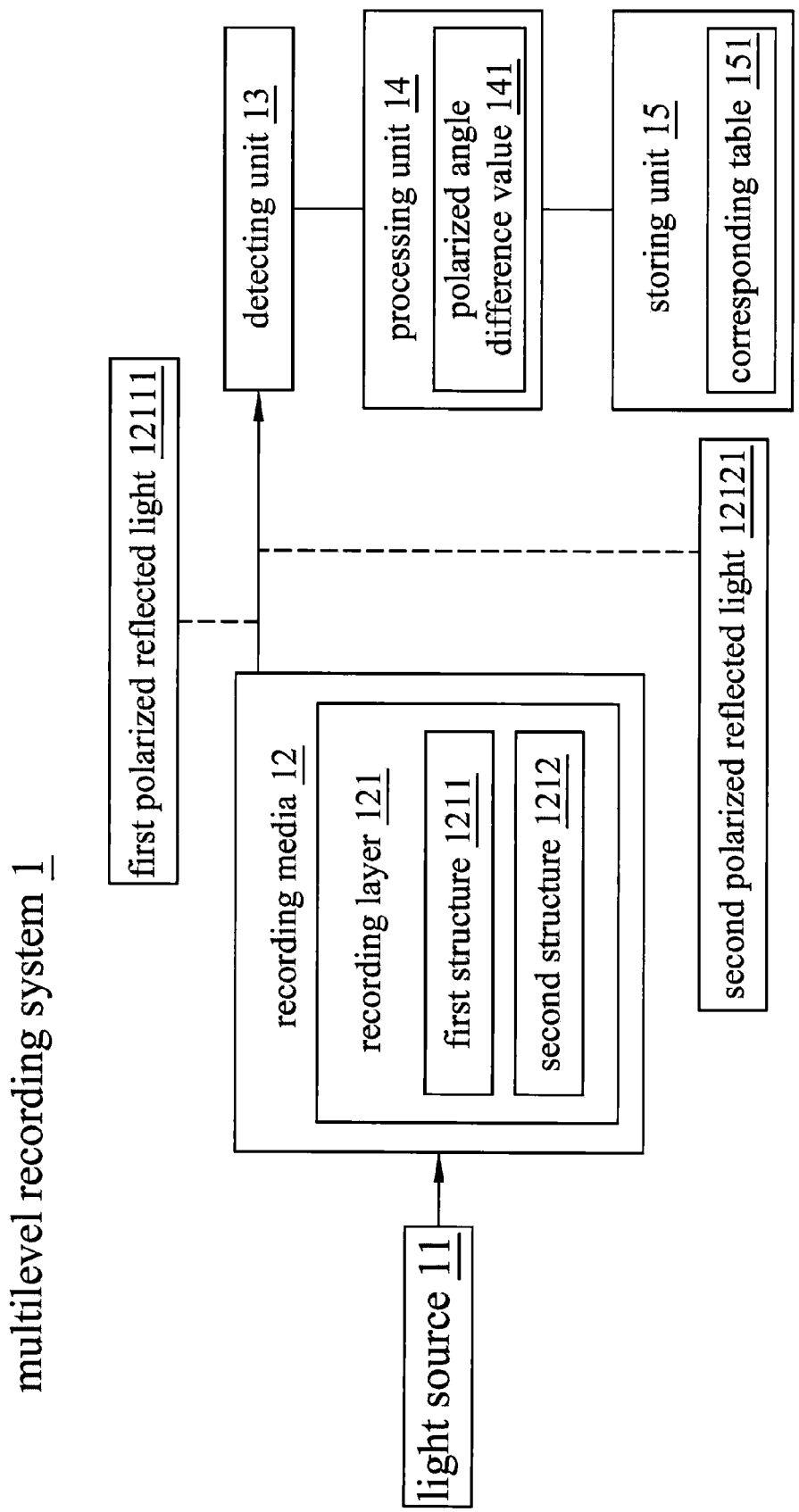
FIG. 1 illustrates a schematic diagram of the multilevel recording system in accordance with the present invention.

Please refer to FIG. 1, which illustrates a schematic diagram of the multilevel recording system in accordance with the present invention. As shown in this figure, the multilevel recording system 1 is applicable to a recording media 12 having a recording layer 121 with a first structure 1211 and a second structure 1212, and the first structure 1211 and the second structure 1212 are different structure. The recording media 12 could be a phase change disk, thus the first structure 1211 and the second structure 1212 could be a crystalline structure and an amorphous structure respectively. The polarized angle of the reflected light of the disk will be $\theta_c$ when the disk is totally crystallized, and the polarized angle of the reflected light of the disk will be $\theta_a$ when the disk is totally amorphous. The polarized angle of the reflected light of the disk is related to the crystalline percentages of the recording layer, thus by changing the crystalline status of the recording layer, the polarized angle of the reflected light could be changed.

In the aforementioned embodiment, the phase change disk is used to describe the recording media 12; however the recording media 12 of the present invention is not limited to the disk but could be presented with another type of media for recording data such as a memory device. In addition, the difference between the first structure 1211 and the second structure 1212 is not limited to a different atomic arrangement structure microscopically, but could be a different appearance of a macroscopic structure or a different concentration structure or a different phase structure. Besides, the first structure 1211 and the second structure 1212 could be changed not only by providing different intensity laser source to change the crystalline status of the recording layer, but also through electric wave, acoustic wave, electric force, magnetic force, stress or heat to change the first structure and the second structure of the recording layer.

The multilevel recording system 1 comprises a light source 11, a detecting unit 13, a processing unit 14 and a storing unit 15. The beams could be a laser beam provided to the recording media 12. The detecting unit 13 detects a first polarized reflected light 12111 of the first structure 1211 and a second polarized reflected light 12121 of the second structure 1212. The processing unit 14 connects to the detecting unit 13 to calculate the polarized angle difference value 141 between the first polarized reflected light 12111 and the second polarized reflected light 12121. The storing unit 15 stores a corresponding table 151 having a corresponding relationship between a polarized angle difference value 141 and a multilevel recording. The processing unit 14 further reads the corresponding table 151 to process multilevel recording.

Wherein, the detecting unit 13 could be realized by an ellipsometry, but it is not limited, the device that could detect the polarized reflected light could be used as the detecting unit of the present invention. The measuring error of the ellipsometry is 0.2 degree, and thus the present invention could detect the polarized angle difference value by the ellipsometry to process the multilevel recording.

It is worth to notice that the present invention could not only calculate the polarized angle of the reflected light through the detecting unit (for example, the ellipsometry detects the ellipse parameters of the polarized light), but also detect the angle of the reflected light directly. Directly detecting the angle of the reflected light and calculating the angle of the reflected light indirectly are all fall into the range claimed by the preset invention.

Figure 2:
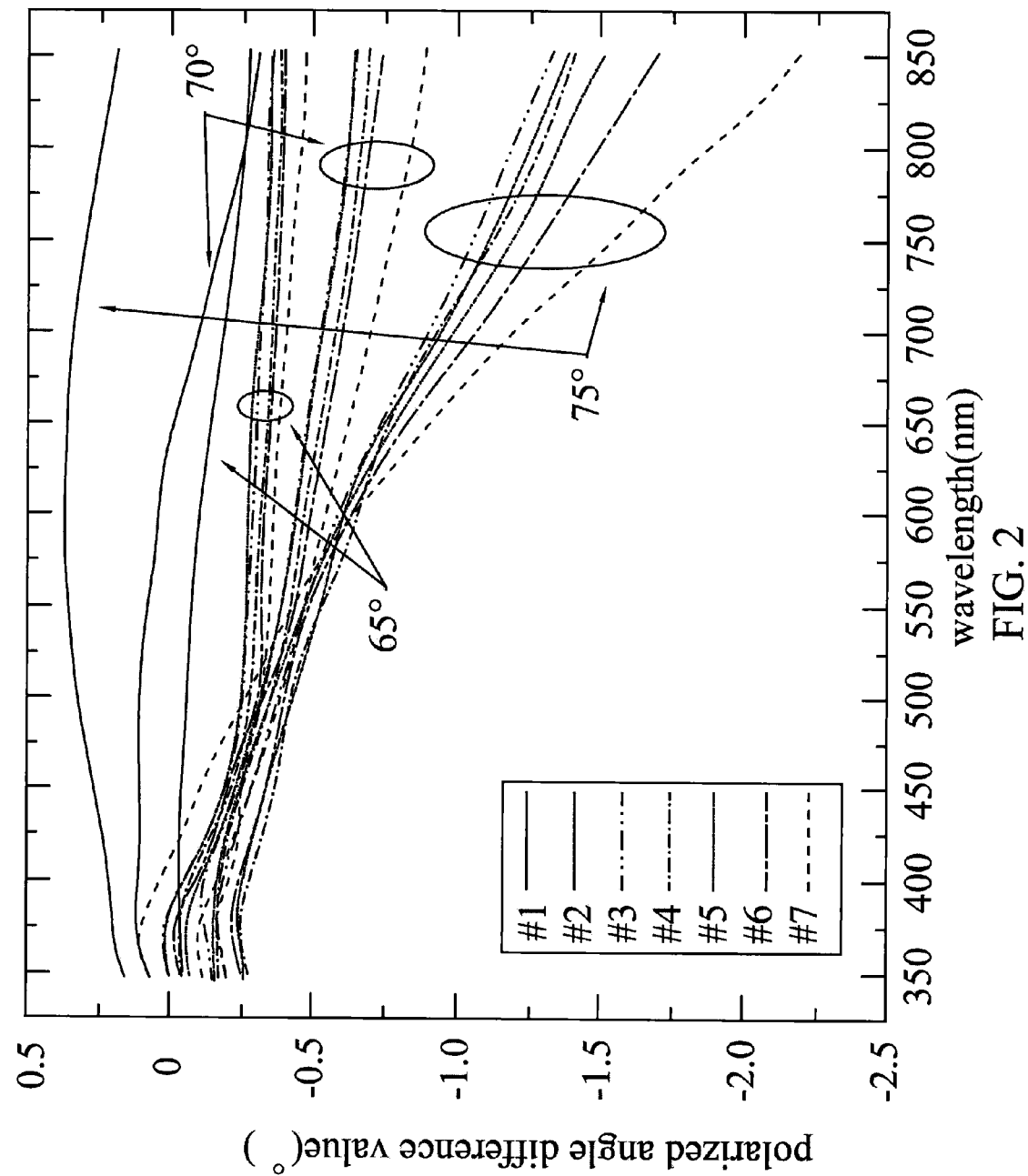
FIG. 2 illustrates a schematic diagram of the first embodiment of the multilevel recording system in accordance with the present invention.

Please refer to FIG. 2 and table 1, which illustrates a schematic diagram of a first embodiment of the multilevel recording system in accordance with the present invention and seven $GeSb_9$—Te thin films doped with different doping concentration. In this embodiment, three incident lights with different incident angle (for example 65, 70 and 75 degree) are emitted into the recording layer 121 of the recording media 12. The recording layer 121 is formed by doping different concentration elements into a chemical compound or an alloy. The chemical compound could be oxides, nitrides, carbides, silicides or sulfur compounds (i.e. chemical compounds comprises sulfur, selenium, tellurium or polonium), and the alloy could be antimony-based, arsenic-based, bismuth-based or iron-based.

Take the present embodiment for example, the recording layer 121 is a $GeSb_9$ thin film doped with tellurium. As shown in the table 1, there are seven different doping concentration $GeSb_9$—Te thin film listed:

TABLE 1

| Number | 1 | 2 | 3 | 4 | 5 | 6 | 7 |
| --- | --- | --- | --- | --- | --- | --- | --- |
| Ge | 9.2 | 9.1 | 8.8 | 8.4 | 8.1 | 5.6 | 8.3 |
| Sb | 90.8 | 89.1 | 89.1 | 88.0 | 87.3 | 84.9 | 83.9 |
| Te | 0 | 1 | 2.1 | 3.6 | 4.6 | 5.6 | 7.8 |

As shown in FIG. 2, the polarized angle difference values are quite different between the $GeSb_9$ thin film doped with tellurium and that of the $GeSb_9$ thin film without tellurium doping. The polarized angle difference values of the first three lines are close to zero due to the low Te doping concentration, and thus they could be thought as pure $GeSb_9$ thin films. For the $GeSb_9$ thin film highly-doped with tellurium, the polarized angle difference value is negative, and the variation of the polarized angle difference values are increased according to the Te doping concentration. Thus, the present invention could change the polarized angle difference values by adjusting the composition of the recording layer of the phase change disk, such as increasing the Te doping concentration.

In addition, when the wavelength of the beam is longer than 500 nm, the polarized angle difference values which could be detected by the detecting unit 13 are all larger than 0.2 degree. When the wavelength of the beam is near to the infrared region, the polarized angle difference values which could be detected by the detecting unit 13 are close to 2.5 degree. Thus the present invention could pre-store a corresponding table 151 in the storing unit 15 to process the multilevel recording.

Due to there may be a measuring angle error of the detecting unit, thus the interval 0.5 is selected as a basis for dividing, as shown in table 2, so as to process the multilevel recording. For example, when the processing unit 14 calculates the polarized angle difference values 141 of the first polarized reflected light 12111 and the second polarized reflected light 12121 is less than 0.5 degree, the multilevel recording system 1 process a one-level recording; and when the processing unit 14 calculates the polarized angle difference values 141 is between 0.5 and 1 degree, the multilevel recording system 1 process a two-level recording. The rest may be deduced by analogy, and the present embodiment could process six-level recording. Therefore, the present invention could process more than one-level recording according to the crystalline status of the recording layer identified by selecting the proper recording media and detecting and calculating the polarized angle of the reflected lights.

TABLE 2

| Polarized angle difference value Δθ | Δθ < 0.5 | 0.5 < Δθ < 1 | 1 < Δθ < 1.5 |
| --- | --- | --- | --- |
| Order | 1 | 2 | 3 |
| Polarized angle difference value Δθ | 1.5 < Δθ < 2 | 2 < Δθ < 2.5 | Δθ > 2.5 |
| Order | 4 | 5 | 6 |

For the disk having n recording spots per unit area, when processing six-level recording, the average information amount recorded by each recording spot is log 6/log 2 times (2.585 times) larger than that of the two-level recording. This equals a two-level recording disk having 2.585*n recording spots, i.e. the areal density is increased to 2.585 times. Take a typical 650 MB ($650*10^6$) CD-RW for an example, when processing the six-level recording, the density of the same disk could be raised to 1.68 GB ($1.68*10^9$B); and take a 4.7 GB DVD-RAM for another example, when processing the six-level recording, the density of the same disk could be raised to 12.15 GB.

In another embodiment, the present invention could choose one degree as basis for dividing, as shown in table 3. When the processing unit 14 calculates the polarized angle difference values 141 is less than 1 degree, the multilevel recording system 1 process a one-level recording; when the processing unit 14 calculates the polarized angle difference values 141 is between 1 and 2 degree, the multilevel recording system 1 process a two-level recording; and when the processing unit 14 calculates the polarized angle difference values 141 is between 2 and 3 degree, the multilevel recording system 1 process a three-level recording.

TABLE 3

| Polarized angle difference value $\Delta\theta$ | $\Delta\theta < 1$ | $1 < \Delta\theta < 2$ | $2 < \Delta\theta < 3$ |
|---|---|---|---|
| Order | 1 | 2 | 3 |

For the disk having n recording spots per unit area, when processing three-level recording, the average information amount recorded by each recording spot is log 3/log 2 times (1.585 times) larger than that of the two-level recording. This equals a two-level recording disk having 1.585*n recording spots, i.e. the areal density is increased to 1.585 times. Take a typical 650 MB ($650*10^6$) CD-RW for an example, when processing the three-level recording, the density of the same disk could be raised to 1.03 GB ($1.03*10^9$B); and take a 4.7 GB DVD-RAM for another example, when processing the three-level recording, the density of the same disk could be raised to 7.45 GB.

Please refer to FIG. 3, which illustrates a flow chart of the multilevel recording method in accordance with the present invention. Step S1: providing a plurality of beams to a recording layer of the recording media. The recording layer has a first structure and a second structure. The first structure and the second structure could have a different atomic arrangement structure microscopically, a different appearance of a macroscopic structure, a different concentration structure or a different phase structure. Step S2: detecting a first polarized reflected light of the first structure and a second polarized reflected light of the second structure by a detecting unit so as to calculate a polarized angle difference value between the first polarized reflected light and the second polarized reflected light. Step S3: storing a corresponding table by a storing unit. The corresponding table comprises a corresponding relationship between the polarized angle difference value and a multilevel recording. Steps S4: looking up the corresponding table to process multilevel recording by the processing unit.

The present invention could change the crystalline status of the recording layer by different intensity light sources. When the crystalline status is changed, the refraction index will be effected, and thus the ellipse parameters (the amplitude or the phase shift of the polarized reflected light) detected by the detecting unit will also be changed. Thus the present invention could process multilevel recording by changing the intensity of the light source, or changing the composition of the recording layer of the recording media.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A multilevel recording method, applicable to a recording media, comprising the following steps of:
   providing a plurality of beams to a recording layer of the recording media, the recording layer having a first structure and a second structure;
   detecting a first polarized reflected light of the first structure and a second polarized reflected light of the second structure by a detecting unit;
   calculating a polarized angle difference value between the first polarized reflected light and the second polarized reflected light by a processing unit;
   storing a corresponding table by a storing unit, the corresponding table comprising a corresponding relationship between the polarized angle difference value and a multilevel recording; and
   looking up the corresponding table to process multilevel recording by the processing unit.

2. The multilevel recording method of claim 1, wherein the method further comprises the following steps before providing the beams to the recording layer of the recording media:
   emitting the beams with different intensity toward the recording media to change the first structure and the second structure of the recording layer.

3. The multilevel recording method of claim 1, wherein the method further comprises a step of:
   emitting the beams to the recording layer of the recording media with different angle of incidence.

4. The multilevel recording method of claim 1, wherein the method further comprises a step of doping elements with different concentration into a chemical compound or an alloy to form the recording layer.

5. The multilevel recording method of claim 4, wherein the chemical compound is oxides, nitrides, carbides, silicides or sulfur compounds.

6. The multilevel recording method of claim 4, wherein the alloy is antimony-based, arsenic-based, bismuth-based or iron-based.

7. The multilevel recording method of claim 4, wherein the method further comprises a step of doping tellurium (Te) into germanium antimonide ($GeSb_9$) to form the recording layer.

8. The multilevel recording method of claim 1, wherein the method further comprises a step of using a phase change disk as the recording media.

9. The multilevel recording method of claim 8, wherein the first structure and the second structure are a crystalline structure and an amorphous structure respectively.

10. The multilevel recording method of claim 9, wherein the method further comprises a step of detecting the first polarized reflected light of the crystalline structure of the phase change disk, and detecting the second polarized reflected light of the amorphous structure of the phase transformation disk by the detecting unit.

11. The multilevel recording method of claim 1, wherein the first structure and the second structure have a different atomic arrangement structure microscopically, a different appearance of a macroscopic structure, a different concentration structure or a different phase structure.

12. The multilevel recording method of claim 1, wherein the method further comprises a step of changing the first structure and the second structure of the recording layer by electric wave, acoustic wave, electric force, magnetic force, stress or heating.

13. The multilevel recording method of claim 1, wherein the detecting unit is an ellipsometry.

14. A multilevel recording system, applicable to a recording media, comprising a recording layer having a first structure and a second structure, the multilevel recording system comprising:
   a light source, providing a plurality of beams to the first structure and the second structure of recording media;
   a detecting unit, detecting a first polarized reflected light of the first structure and a second polarized reflected light of the second structure;

a storing unit, storing a corresponding table having a corresponding relationship between a polarized angle difference value and a multilevel recording;

a processing unit, calculating the polarized angle difference value between the first polarized reflected light and the second polarized reflected light, and the processing unit further looking up the corresponding table to process multilevel recording according to the polarized angle difference value.

15. The multilevel recording system of claim 14, wherein the light source emits the beams toward the recording media with different intensity to change the first structure and the second structure of the recording layer.

16. The multilevel recording system of claim 14, wherein the light source emits the beams to the recording layer of the recording media with different angle of incidence.

17. The multilevel recording system of claim 14, wherein the recording layer is a chemical compound doped elements with different concentration, or an alloy doped elements with different concentration.

18. The multilevel recording system of claim 17, wherein the chemical compound is oxides, nitrides, carbides, silicides or sulfur compounds.

19. The multilevel recording system of claim 17, wherein the alloy is antimony-based, arsenic-based, bismuth-based or iron-based.

20. The multilevel recording system of claim 17, wherein the recording layer is tellurium (Te) doped germanium antimonide ($GeSb_9$).

21. The multilevel recording system of claim 14, wherein the recording media is a phase change disk.

22. The multilevel recording system of claim 21, wherein the first structure and the second structure are a crystalline structure and an amorphous structure respectively.

23. The multilevel recording system of claim 22, wherein the detecting unit detects the first polarized reflected light of the crystalline structure of the phase change disk, and detects the second polarized reflected light of the amorphous structure of the phase change disk.

24. The multilevel recording system of claim 14, wherein the first structure and the second structure have a different atomic arrangement structure microscopically, a different appearance of a macroscopic structure, a different concentration structure or a different phase structure.

25. The multilevel recording system of claim 14, wherein the first structure and the second structure of the recording layer are generated by applying electric wave, acoustic wave, electric force, magnetic force, stress or heating to the recording layer.

26. The multilevel recording system of claim 14, wherein the detecting unit is an ellipsometry.

* * * * *